United States Patent

[11] 3,577,705

| [72] | Inventor | Ian B. Sharlit<br>Los Angeles, Calif. |
|---|---|---|
| [21] | Appl. No. | 805,065 |
| [22] | Filed | Dec. 23, 1968 |
| [45] | Patented | May 4, 1971 |
| [73] | Assignee | Hitco, a corporation of California.<br>Continuation-in-part of application Ser. No. 627,914, Apr. 3, 1967, now abandoned. |

[54] FILTER SYSTEM
19 Claims, 4 Drawing Figs.

[52] U.S. Cl...................................................55/4, 55/13,
55/110, 55/112, 55/120, 55/126, 55/131, 55/136,
55/139, 55/151, 55/154, 55/283, 55/300, 55/302,
55/304, 55/319, 55/324, 55/334, 55/341, 55/426,
55/461, 55/465

[51] Int. Cl....................................................... B03c 3/36
[50] Field of Search........................................... 55/2, 4, 15,
110, 112, 120, 126, 131, 136, 139, 151, 154, 283,
300, 302, 304, 319, 324, 334, 341, 426, 461, 465,
101

[56] References Cited
UNITED STATES PATENTS

| 945,917 | 1/1910 | Cottrell ........................ | 55/150X |
| 1,931,436 | 10/1933 | Deutsch ....................... | 55/131 |
| 1,947,447 | 2/1934 | Brassert et al. ............... | 55/106X |
| 2,142,128 | 1/1939 | Hoss et al. .................... | 55/130X |
| 2,932,362 | 4/1960 | Roper........................... | 55/341X |
| 3,322,489 | 5/1967 | Moutaud et al............... | 23/209.4X |
| 3,370,646 | 2/1968 | Hopper ........................ | 55/1X |

FOREIGN PATENTS

| 698,874 | 10/1953 | Great Britain................ | 55/150 |

*Primary Examiner*—Dennis E. Talbert, Jr.
*Attorney*—Fraser & Bogucki

ABSTRACT: An air filtering system in which the filter elements through which the air passes are composed of an electrically conductive cloth having a high carbon content. The cloth is maintained at a substantial electrical potential relative to electrical ground. The electrical charge is conducted to the particles present in the filter bag, thereby causing mutual repulsion and other effects between the charged particles and increasing the gas permeability of the filter system.

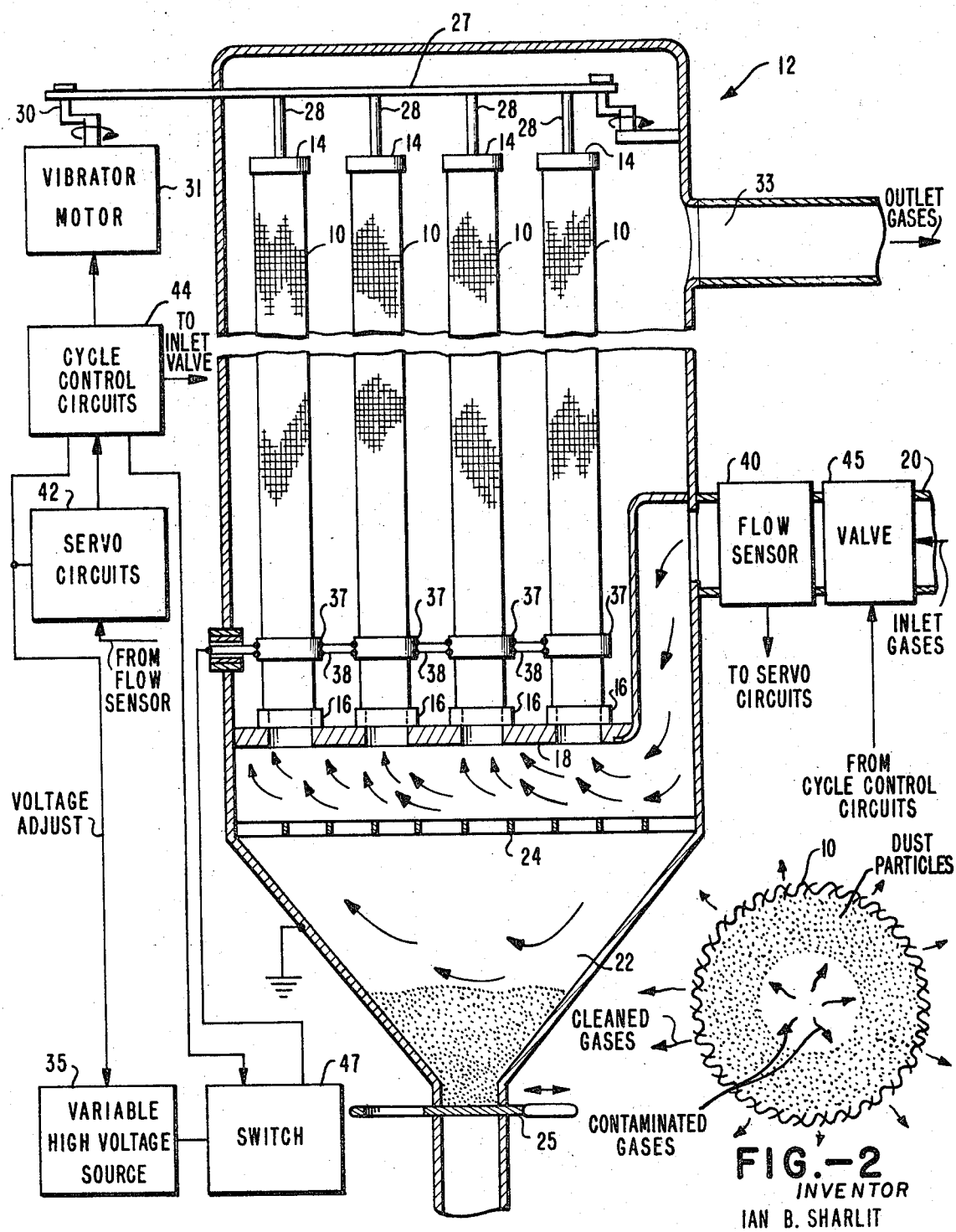

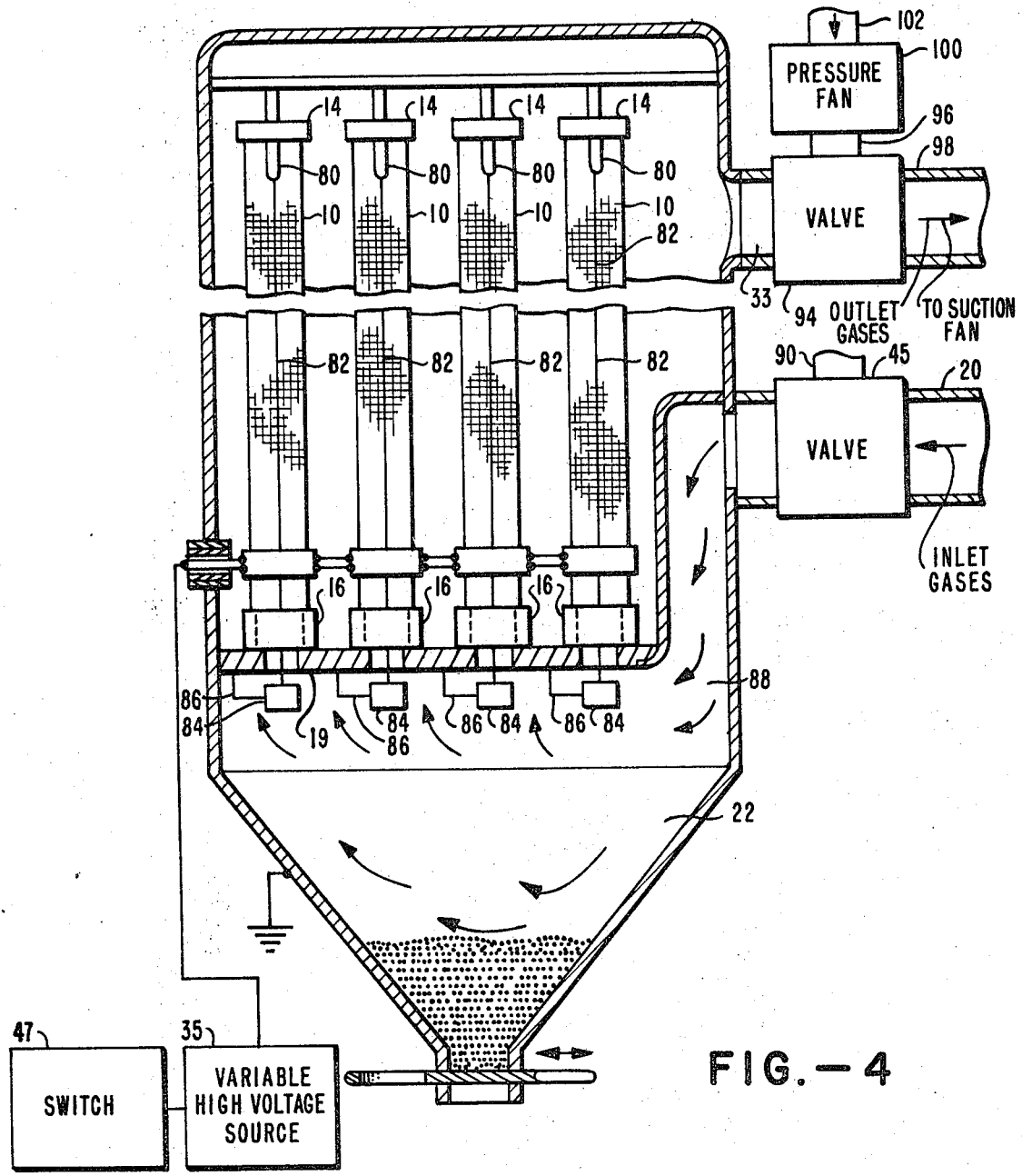
FIG.—4
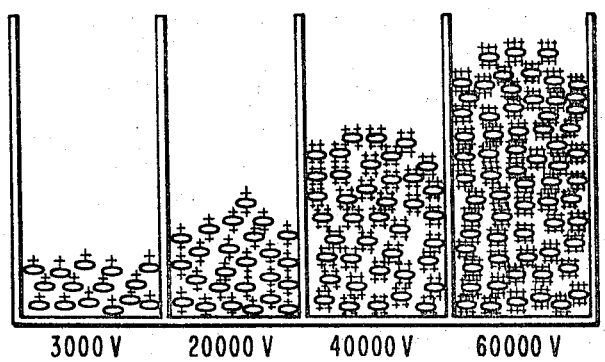
FIG.—3

FILTER SYSTEM

This application is a continuation-in-part of my copending application Ser. No. 627,914 filed Apr. 3, 1967 now abandoned.

BACKGROUND OF THE INVENTION

A variety of existing techniques are available to reduce air pollution arising from industrial and other processes, and to extract valuable byproducts in particulate form from gases. For specific purposes, these techniques may be employed separately or in combination. The principal available devices include electrostatic precipitators which collect the particles by attraction, and filter bag systems which collect the particles by mechanical entrapment.

In filtering particles from the air it has been observed that generally relatively large particles, such as of the order of about 5 microns or larger in minimum length or diameter, do not present much problem since such particles are readily picked out of the air by electrostatic precipitators or easily collected by filter bag systems. However, smaller size particles are much more difficult to remove efficiently from the air by known filtration methods. In addition, the particles that are to be removed from a given volume of air are generally of varying conductivity. Thus, for example, where an electrostatic precipitator device is used, nonconductive particles such as animal or vegetable material as is often found in "house dust," will pass through the precipitator unfiltered. It is also known that varying conditions of humidity changes the conductivity of particles and often adversely affects the efficiency of an electrostatic precipitation filter system.

Filter bag systems generally utilize cloth or other filter element materials, and use an array of bags of elongated or tubular form having one end closed and the other open. The bags are mounted vertically in a frame structure with the open ends lying in or adjacent to a common plane so that gases may be supplied from a single inlet line. Although, in a small minority of filter bag systems the open ends are positioned at the top of the structure, the more common practice is to pass the gases upwardly into the filter bags so that gravity aids in removing collected particles. As contaminated gases pass into the filter bags, the particles collect in a mass which quickly reduces the permeability of the bags to gas flow, and the back pressure builds up while the flow rate is decreased. Although this formation of a "filter cake" aids to a degree in extraction of particles, the reduction in flow results in loss of efficiency within a short time. Consequently, relatively brief collection and cleaning cycles are used, of the order of about 2 to 30 minutes total duration, in order to keep filter efficiency at high average level over a long period. Cleaning of the bags is effected by bag vibration by mechanical means, or by reverse gas flow, or both.

In order to be suitable for an effective filtration system, filter bags should be flexible, adequately strong and abrasion resistant, have a relatively dense weave, and be resistant to the corrosive effects of hot gases and contaminants. Such properties have seldom been obtained together, and therefore a need exists for improved filter bags. Even more important, however, is the desirability of obtaining basic improvements in the efficiency of the filtering system itself. If the duration of the collection cycle and its ratio to the duration of the cleaning cycle could both be increased, substantial reductions could be achieved in the size and cost of a filter bag system for any specific application, and fewer filter bags would be needed. It is to the solution of such problems that the filter system of the present invention is directed.

SUMMARY OF THE INVENTION

The present invention comprises a system in which the filter elements through which gases are passed are fabricated of an electrically conductive material such as one having high carbon content and maintained at a substantial electrical potential relative to electrical ground. The collected particles are thereby electrostatically charged, and forces of mutual repulsion both between the charged particles and the particles and filter bag expand the filter cake and increase its permeability to gas flow, permitting higher gas volumes to be passed through the system before cleaning is necessary, without impeding the normal filter action.

The system may also include means for increasing the electrical potential on the filter bags as the amount of particulate matter in the bags is increased to tend to maintain the gas permeability of the system substantially constant.

One aspect of the invention is the provision of an improved filter bag construction using high strength carbon cloth. The carbon cloth is flexible, durable and readily fabricated into desired shapes. The electrical conductivity of the cloth is high, such that high potential levels can be established with low-power sources. Further, the filter bag may be impregnated with a lubricant for greater strength and resistance to abrasion without substantial reduction of the electrical properties.

In accordance with another aspect of the invention, the electrical potential of the filter bags is maintained at a sufficiently high level to impose electrostatic charges on substantially all particles. The charges cause repulsion of a substantial fraction of the contaminating particles prior to their entry into the filter bags. This fraction is caused to settle out in the collector portion of the system, effectively providing a precleaning action.

Other aspects of the invention relate to the provision of means for improving the efficiency of the filtering and cleaning cycles. In this embodiment, a wire or cable is present within the bag and is centrally located with relation to the bag walls and preferably extends along a substantial length of the bag. The wire is maintained at electrical ground relative to the electrostatically charged bag and acts to concentrate the electrostatic field within the bag.

The preferred filter bags used in the system of the invention are prepared from carbon fabrics having a carbon content of 90 percent or more, by weight which have been impregnated with up to about 10 percent by weight of a suitable lubricant material.

BRIEF DESCRIPTION OF THE DRAWINGS

A better understanding of the invention, as well as the invention itself, may be had by reference to the following description, taken in conjunction with the accompanying drawings, in which:

FIG. 1 is a simplified sectional and block diagram representation of a system in accordance with the invention;

FIG. 2 is a cross-sectional view of a filter bag, showing the disposition of the filter cake therein during the operation of the system of FIG. 1;

FIG. 3 is an enlarged and simplified diagrammatic representation of the variations occurring in the spatial dispositions of the collected particles during the operation of the system of FIG. 1; and FIG. 4 is a simplified sectional representation of a system such as that shown in FIG. 1, swing the use of a ground wire.

DETAILED DESCRIPTION

The filter bags of the present invention are composed of carbon fabrics having a relatively high carbon content. By "carbon fabrics" and "fabrics having high carbon content" as used herein is meant carbonized fabrics having a carbon content of at least about 75 percent and preferably at least about 97 percent. Preferred carbon fabrics are obtained by heating cellulosic materials such as viscose rayon, cotton, wool and the like at increasing elevated temperatures under nonoxidizing conditions until the desired amount of carbonization of the material has occurred. The carbon fibers and processes for preparing them are well known in the art as disclosed, for example, in U.S. Pat. No. 3,294,489. The carbonized fibers may be heated at even higher temperatures, i.e. between about 2,000° and 3,000° C. under suitable conditions and for a sufficient time to at least partially graphitize the carbon thereby substantially increasing its electrical conductivity. This type of fabric has relatively low resistivity and very little capacitance and thus does not tend to store substantial charge nor does it require a lengthy charging interval. Synthetic carbonizable resin fabrics, for example, polyacrylonitrile and its copolymers may also be used as precursors in preparing electrically conductive carbon fabric filter bags. Other useful materials include fiberglass, silica or other fabric materials having an electrically conductive coating. Yet, regardless of the type of fabric, it must be of a weave capable of substantially physically retaining particulate matter in the manner of a true filter bag while allowing gases to easily pass therethrough.

In one specific system in accordance with the invention, a plurality of electrically isolated filter bags are positively or negatively charged from a variable voltage source through switching means that provide selective disconnection from the voltage source. The voltage source is variable within a predetermined range, from approximately 3,000 to approximately 60,000 volts in this example. The volume of gas flowing into the filter bag system is sensed, and the potential level is increased as the flow rate decreases due to enlargement of the filter cake. The electrostatic charges on the particles are thus increased to expand the filter cake and to maintain the flow rate above a selected minimum. Upon increase of the potential above a predetermined level, the collection cycle is terminated and the normal cleaning cycle begun. During cleaning, the expanded filter cake is readily removed as the filter bag is vibrated or as the gas flow is reversed, inasmuch as do electrostatic charges on the particles do not materially diminish until they are free of the bags.

A system for removing the dust from contaminated process gases is shown in FIG. 1, in which details of the mechanism have been omitted for simplicity and clarity. A plurality of filter bags 10, each of generally cylindrical form, are disposed in parallel vertical fashion within a housing 12. The filter bags 10, only a few of which are shown for simplicity, each comprise an elongated tube of electrically conductive material which in the present embodiment comprise a material having a high carbon content. Each tube has a closed upper end and an open bottom end that serves as the entry zone for the contaminated gases. At the upper ends, the bags 10 are coupled to electrically insulative support cap members 14. At the bottom ends, the bags 10 are fixedly mounted in other electrically insulative support rings 16 which are disposed about registering apertures in a nonconductive divider wall 18 that separates the housing 12 into inlet and outlet portions. The bags 10 extend within the outlet portion in which the existing gases have been cleaned of particulate matter.

It will be appreciated that the filter bags need not be cylindrical but can have any closed geometry that lends itself to a particular application. It will further be understood that the filter bags need not be closed at the top and open at the bottom, but that this positioning can be reversed if desired with a corresponding change of location of the port for inlet gases and other elements of the system. The filters can also be placed in a gas conduit in a horizontal position such that there is provided an ingress aperture for inlet gases and a closed end to restrict the flow of gas directly through the bag. In some instances a single filter bag of the appropriate dimensions can be disposed directly within a gas conduit without the necessity for a housing.

The inlet portion of the housing 12 includes an inlet conduit 20 for the contaminated gases which directs the gases into a header or plenum chamber immediately below the divider wall 18. The plenum chamber is separated from a conical collector chamber 22 by a perforated septum 24, spaced apart from the divider wall 18. The walls of the collector chamber 22 may be nonconductive, but are preferably made of conductive material that is electrically grounded. At the bottom of the collector chamber 22 a manually or automatically operable valve mechanism 25 of any conventional form provides an outlet for the dust particles.

At the upper end of the housing 12 structure, the insulative cap members 14 coupled to the upper ends of the bags 10 are mechanically agitated by an eccentric drive arm 27 through different ones of a plurality of attached insulative rods 28. The eccentric drive arm 27 is operated from the shaft of a vibrator motor 31, through a crank arm assembly 30, when the motor 31 is actuated. The outlet region for the housing is thus the volume above the divider 18 and encompassing the bags 10, and extending to an outlet aperture 33 through which the cleaned gases pass to an associated system.

The electrically conductive bags 10 are electrically connected to a variable high voltage source 35 in a fashion such that they are electrically isolated from the remainder of the structure. In the example shown, a plurality of flexible conductive bands 37 are attached to the cloth about a lower region of each bag 10 at a position spaced apart from the insulative rings 16 although the spacing is not necessary. The conductive bands 37 are mechanically and electrically interconnected by conductive rods 38 so as to provide a common electrical connection and a fixed spatial relation between the bags. Similar conductive bands (not shown) may be disposed at other points along the bags 10, and these may be mechanically and electrically interconnected to each other and the voltage source 35; alternatively, instead of the conductive band, a single point contact for each bag may be used. It is preferred that the electrical connection system which contacts the filter bags 10 be flexible in order to prevent undue wear on the bags during flexing.

The flow rate of the inlet gases is measured by a flow sensor 40 mounted in the inlet conduit 20. The flow sensor 40 provides an output signal whose level indicates the pressure differential across the bags 10, and thus the efficiency of the filter action and the thickness of the filter cake. Other means (not shown) may alternatively be used for this purpose. The signal derived from the flow sensor 40 is applied to servo circuits 42, which comprise conventional preamplifier, error signal generator and amplifier circuits for providing a signal to adjust the level of the electrical potential maintained by the voltage source 35 in accordance with the inlet gas flow rate. Time cycle control circuits 44 here responsive to the potential level maintain at the voltage source 35, operate the vibrator 31, the servo circuits 42 and an inlet valve 45.

Servo operation is not required, although advantages are achieved by its use. Because conventional timing mechanisms of a variety of forms may be used, details of the present servo-type system, as well as repetitive timing control mechanisms of invariable types, have been omitted for simplicity. In the present system, the complete sequence proceeds as follows, taking the termination of a cleaning cycle as the starting point;

1. The inlet valve 45 is opened and the servo circuits 42 are enabled.
2. The servo circuits 42 control the high voltage source 35 during the collection cycle.
3. When a predetermined potential level is reached, the servo circuits 42 are disabled and a switch 47 coupling the source 35 to the bags 10 is opened.
4. The cleaning cycle is then carried out by energizing the vibrator motor 31 for a selected interval.

In this system, the selected maximum voltage may be detected by conventional means such as threshold responsive or comparator circuits. It should be noted that in a nonservo operation a simple cyclic timer may be used, and that the voltage may be increased in a predetermined fashion.

This system provides successive collection and cleaning sequences, but the duration of the collection cycle are considerably lengthened with respect to prior art systems. Further, the operative conditions during collection are varied to achieve the greatest efficiency. During the collection cycle, the inlet valve 45 is opened, and the contaminated gases pass through the inlet conduit 20 into the inlet portion of the housing 12, as the voltage source 35 maintains an initial voltage of approximately 3,000 volts or more. Specific voltage ranges utilized will depend on a number of factors such as filter bag diameter, gas velocity, humidity conditions, type of particulate matter, etc. Although positive potential levels are assumed in the present example, it will be understood that electrostatic charges of either polarity may be used on the filter bag. Negative potentials may be preferred because it is usually found that higher potential levels can be reached without arcing or discharging. Operation of practical systems in accordance with the invention at positive potentials is illustrative of the utility of the inventive concept under all conditions.

Because the filter bags 10 are highly conductive, and electrically isolated from the supporting structure by the elements 14 and 16 at the opposite ends, the entire filter bag assembly is held at the same potential level. This level is sufficiently high to impose electrostatic charges on substantially all the particle matter flowing into the system. Ions are trapped in or affixed to the particles, to such an extent that the particles themselves appear as charged bodies. With substantially all particles charged in this fashion, and with high charge levels relative to the masses of the bodies, the forces of mutual repulsion arising from the like charges tend to expand the filter cakes forming within the individual filter bags 10.

As best seen in the sectional view of FIG. 2, the incoming gases in the center of the filter bag 10 drive the dust particles radially outwardly toward the inner surface of the bag, where they would normally form as a compacted filter cake. However, because the particles have an electrostatic charge corresponding to that on the filter bag 10, the particle matter does not build up in dense form. Initially, the collected particles tend to remain adjacent to the inner surface of the bag. As more particulate matter is collected, the particles increasingly tend to be compacted radially outwardly by the pressure of the incoming gases and the mass of additional particles. Due to the electrostatic charges, however, this compaction is opposed to an extent such that the particles still tend to retain mobility. A density gradient therefore exists across the filter cake, with greatest particle density adjacent the inner bag surface. Because of the particle dispersion maintain by the electrostatic charges, the permeability of the collected particles to the passage of gases is kept at a higher level. This particle dispersion and high filter cake permeability represents a significant advance over the prior art electrostatic precipitation systems which in contrast form a dense filter cake impermeable to gases. In effect, the interior volume of the bags 10 is more efficiently used. Thus larger volumes of gases, and consequently greater amounts of particulate matter, may be handled before the filter bag requires cleaning. The efficiency of the cleaning action is further substantially enhanced because virtually all particulate matter, no matter how small, tends to be repulsed by the electrostatically charged filter bag and therefore remains entrapped.

The duration of the collection cycle is greatly extended and the efficiency of the system is further increased by variation of the charging voltage in accordance with the operative condition of the system. As the masses of collected particles increase in the filter bags 10, the rate of flow in the inlet portion of the system is measured at the flow sensor 40, and the servo circuits 42 control the setting of the adjustable voltage source 35 so as to tend to maintain the permeability substantially constant.

It will be appreciated that the amount of charge on the particles within the filter bags will vary depending on particle size, conductibility conditions of humidity and the like. More specifically, larger particles will usually retain charge better than smaller particles and nonconductive material will retain a charge longer than conductive material. In addition, where the air present in the filter bags is relatively dry, the particles will retain electrostatic charges better than under conditions of higher humidity. Finally, the more filter bags present in a given system, the greater the electrostatic current that will be necessary to charge the particles. Thus, variables as set forth above will cause variations in the amount of current that will be necessary in the system to maintain particle charge and the corresponding gas permeability of the filter cake at desired levels. It should also be appreciated that a very small current flow will be present in a system as described herein due to the fact that charged particles are being removed from the system during the cleaning phase. Conventional electrical devices for providing the desired potential levels may be employed, because the currents are so small that voltage stability is no problem.

Ultimately, as the collection of particles continues, the dust mass accumulated within the filter bags 10 during the collection cycle and concomitant pressure differential across the filter bags 10 becomes so great that a predetermined maximum operating voltage is reached. At this point the cycle control circuits 44 terminate the collection cycle, and commence the cleaning cycle. As the filter bags 10 are vibrated by the vibrator motor 31, the dust particles collected within the filter bags 10 fall into the hopper 22 for subsequent removal. During the cleaning cycle, the circuit coupling from the voltage source 35 to the filter bags 10 may be opened, by actuating the switch 47, so as to protect against accidental discharge of a high voltage source 35. Because the particles remain charged, the particle mass remains in an expansive condition, and on termination of the gas flow the mutual repulsion of the particles in the interior of the filter bags 10 augments the cleaning action of the vibrator mechanism.

Although FIG. 1 shows mechanical agitation as the means for cleaning the system, a suitable alternative method comprises reversing the flow of air. In a reverse flow system, when the collection cycle is terminated, the airflow is conducted into outlet 33, with valve 45 closing and valve 25 opening manually or automatically, and the particles are drawn with the air from the bags, through the collector chamber 22 and out of the system quickly and conveniently. For many situations, such a cleaning cycle may be preferred to the mechanical means set forth above and thus, the vibrator motor 31 and the means attached thereto for agitating the bags could be eliminated.

Reference is now made to FIG. 3, in which is diagrammatically illustrated the dispersion of the particles during successive stages of the collection cycle. The numbers of particles and the electrostatic charges are depicted only relatively, and in broadest terms. At the initiation of the collection cycle, few particles are collected and the forces of mutual repulsion caused by the electrostatic charges on the particles induced at the 3,000-volt level do not substantially expand the filter cake. As the filter cake builds up, however, the electrostactic charges are correspondingly increased to further expand it. Thus, the depth of the filter cake increases at a faster rate than the accumulation of particles. The permeability of the filter cake to gas flow remains within desired limits until a terminating point is reached at which it is desired to increase the voltage no further. At this point, in the 60,000-volt region, the filter cake is materially expanded. It may occupy the entire interior of the tube 10, and its expansion is such that no true "cake" exists. Because of this more efficient use of the interval volume of a filter bag 10, it is feasible and often preferable, to utilize larger diameter bags than heretofore. In contrast with conventional systems whose permeability decreases rapidly, this system tends to maintain flow rate relatively constant until approaching the end of the collection cycle. This means that the system is cleaning a larger volume of gas during a given interval in the collection cycle.

Filter bags in accordance with the invention have a number of additional advantageous characteristics. If the gaseous environment is nonoxidizing the bags may be used at extremely high temperatures (e.g. 2,000° F.). The bags are extremely resistant to the temperatures typically encountered in the range from 250° F.—800° F., and are virtually immune to thermal shock. Furthermore, they are unaffected by corrosive gases, such as those containing $SO_2$ and $SO_3$.

Preferably, the bag is first prepared by coating a carbon fabric with an up to 10 percent by weight lubricant comprising, for example, Teflon or Teflon and a silicone or a mixture of silicone, Teflon and graphite particles. Superior results are achieved with a fabric impregnated with about 4 percent by weight of lubricant. Then the filter bag may be fabricated and installed in a filter system.

Suitable lubricants include the synthetic resin lubricants, for example, fluoroethylene polymers such as polytetrafluoroethylene (Teflon), polymonochlorotrifluoroethylene, tetrafluoroethylene containing copolymers and the like as well as the well known silicones such as the polyorganosiloxanes of the general formula:

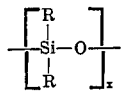

where R may be hydrogen or an organic radical such as alkyl or aryl. Specific examples of the silicones include dimethyl siloxane, diethyl siloxane and phenyl siloxane polymers. For some uses graphite-impregnated carbon fabrics may also be suitable. The lubricant-impregnated carbon fabrics may be prepared by methods well known to those skilled in the art. After fabrication and installation in a high temperature environment, the lubricant present in the fabric may become decomposed to an extent, but a sufficient lubricant residue remains that enhances the abrasion resistance of the filter bag.

In another embodiment of the invention a ground wire extends within at least a portion of each filter bag centrally located with respect to the sides of the bags. This feature will be more clearly understood by referring to FIG. 4 in which description of a number of details common to FIG. 1 have been omitted for simplicity. Inside and at the center of each bag 10 is a second electrically insulative rod 80 which is coupled to cap 14 and which extends downwardly a short distance inside the bag. Coupled to the bottom end of rod 80 is an electrical conductive flexible steel cable 82 which extends downwardly inside the bag and through the apertures in divider wall 19 for a short distance below said divider wall. At the bottom of cable 82 an electrically conductive weight 84 is attached. Wire 86 is attached to the bottom of divider wall 19 which is electrically conductive and weight 84 and is thereby maintained at electrical ground relative to the electrostatic charge of the filter bag 10. Thus cable 82 serves as a ground wire. The presence of the ground wire acts to concentrate the electrostatic field by confining the electrostatic gradient between ground and the bag potential within the bag. In this manner electrostatic potentials at all levels are more effective in maintaining filter cake permeability by electrostatic repulsion of the filtered particles. However, it will be appreciated that the filter cake must not be allowed to build up to such an extent whereby it will contact the ground wire or otherwise cause a short circuit between the ground wire and the charged bag. The ground wire does not act to electrostatically charge, repel or attract the charged particles but only more effectively concentrates the electrostatic field and increase particle repulsion.

FIG. 4 additionally shows alternative means for cleaning the system by reversing the gas flow and particularly in combination with another filter system. During the filtering cycle, contaminated gases flow into the filter bags 10 and the cleaned gases then pass through outlet 33, valve 94, and outlet conduit 98. When the filtering cycle is completed, either for a predetermined time or by a flow sensor (not shown), the switch 47 is opened and the high voltage source 35 is shut off. Valve 45 is closed to conduit 20 and opened to conduit 90 which leads to the inlet gas side of another compartment of a filter system which is on a filtering cycle. Valve 94 is closed to conduit 98 and opened to conduit 96. Pressure fan 100 is started which draws clean gases from the clean gas side of another compartment of a system on a filtering cycle trough conduit 102 and forces the clean gases through valve 94 and conduit 33. This reverses the gas flow through bags 10, loosening the filter cake on the inside of the bags which falls by gravity into chamber 22. The gases flow downwardly inside the bags into plenum chamber 88 and out through valve 45 into conduit 90 leading to the inlet of another compartment of a system which is on a filtering cycle. This cycle may then be reversed by timer of flow-sensing means and another filtering in the system shown begun.

The present invention is to be distinguished over previously well-known electrostatic precipitation systems whereby electrostatically charged particles are attracted to collecting electrodes. More specifically, in such well-known precipitation methods particulate matter is electrostatically charged as it passes through an electrical field surrounding a high voltage discharge electrode and is then directed and attracted to oppositely charged or grounded collecting electrodes. The particulate matter is collected on the collecting electrodes in the form of a densely packed cake of nonrepelling particles. On the other hand, the filtration system described herein results in a filter cake composed of mutually repelling particles physically retained within the filter bags which cake is significantly less densely packed as compared to filter cakes of nonrepelling particles. Such filter cakes are also contrasted with densely packed filter cakes of previously known nonelectrostatic filter bag cleaning systems.

Although there have been described above and illustrated in the drawings various forms of filter systems and improved filter bag constructions in accordance with the invention, it will be appreciated that the invention is not limited thereto, but encompasses all forms and variations falling within the scope of the appended claims.

I claim:
1. In a method for filtering particles from a volume of gas which passes into and through the walls of a filter bag within which bag the particles are substantially physically retained in the form of a filter cake the improvement comprising passing the gas through the walls of an electrically conductive fabric filter bag having an electrostatic charge of above about 3,000 volts and a weave such as to prevent the particles from passing therethrough whereby the particles are rendered mutually repulsive to allow for improved permeability of the filter cake comprising the particles.

2. The method of claim 1 wherein the fabric filter bag comprises carbon cloth having a carbon content of at least 90 percent by weight.

3. A method for improving the permeability of a filter bag system in which particles are filtered from a volume of gas passing into the system which includes a plurality of electrically conductive and flexible carbon cloth filter bags having a weave such that the walls of the bags physically essentially retain particles therein and which filter bags each have a closed end and an open end for receiving the gas and particles and in which filter bags the particles are retained in the form of a filter cake comprising passing the gas and particles into the filter bags while electrostatically charging the filter bags to at least about 3,000 volts whereby the particles comprising the filter cake are rendered electrostatically charged and mutually repulsive.

4. The method of claim 3 comprising the additional steps of sensing the pressure drop across the filter bag, terminating the flow of air into the filter bags as the pressure drop reaches a preselected level and thereafter removing the particles from the bags.

5. A method of removing suspended particulate matter from a gas stream comprising the steps of:
providing a filter bag of electrically conductive fabric material adapted to restrict the passage of particles therethrough but which permits gas to pass through the walls thereof;
imparting to said filter bag a sufficient electrical potential such that particles suspended in a gas stream entering said filter bag become electrostatically charged and mutually repulsed; and
passing a gas stream containing suspended particles to be removed from said gas stream into said filter bag and through the walls thereof whereby said particles are substantially physically retained within said bag in the form of a filter cake in which said particles are mutually repulsive.

6. An electrically conductive woven fabric hollow filter bag containing a filter cake of particulate matter said filter bag having an electrostatic charge thereon sufficient to impart an electrostatic charge to said particulate matter and having a fabric weave such as to substantially prevent passage of particulate matter therethrough and through which gases readily pass and wherein said filter cake comprises electrostatically charged and mutually repulsed particulate matter.

7. The filter bag of claim 6 wherein the fabric comprises an electrically conductive carbon fiber cloth having a carbon content of at least about 90 percent.

8. The filter bag of claim 6 wherein the fabric comprises graphite cloth.

9. The filter bag of claim 6 wherein the carbon fabric is coated with up to about 10 percent by weight lubricant comprising a material selected from the group consisting of silicone, fluoroethylene polymers, graphite and mixtures thereof.

10. An improved filter bag system for extracting particulate matter from flowing gases, comprising:
   at least one hollow filter bag element having a longitudinal axis, an open end and a closed end, said filter bag having its longitudinal axis disposed substantially parallel to and in the path of a gasflow such that said gas enters said open end of said filter bag;
   said filter bag element comprising an electrically conductive woven fabric material having a weave which substantially restricts the flow of particulate matter therethrough while permitting the flow of gas therethrough;
   means coupled to said filter bag element for establishing a substantial electrical potential relative to electrical ground thereon;
   said filter bag element having an electrical charge thereon sufficient to impart an electrostatic charge to particulate matter present within said filter bag; and
   said filter bag containing therein a filter cake of electrostatically charged and mutually repulsed particulate matter.

11. The device as defined in claim 10 wherein said electrically conductive fabric comprises a carbon fiber cloth having a carbon content of at least about 75 percent.

12. The filter bag system of claim 10 wherein said filter bag contains an electrode substantially centrally located within the hollow portion of said filter bag and extending along said longitudinal axis thereof said electrode being at ground potential relative to said filter bag.

13. An improved filter bag system for extracting particulate matter from flowing gases, comprising: a housing member, a plurality of elongated filter bag elements mounted within the housing member, the filter bag elements each having an open end and a closed end and mounted in substantially parallel relation with their open ends lying substantially in a common plane, the filter bag elements comprising a woven textile of fibers having a high carbon content and wherein the weave substantially prevents the flow of particulate matter therethrough while permitting the flow of gas therethrough, and means coupled to said filter bag elements for establishing an electrostatic charge thereon.

14. The filter bag system of claim 13 comprising: means defining gas flow paths within said housing for passing particle-containing gases from an inlet region through said filter bag elements; a controllably variable source of electrical potential coupled to said filter bag elements, means disposed in the inlet region of said housing for sensing gas flow rate, and servo means responsive to said means for sensing and controlling said source of electrical potential to tend to maintain the gas flow rate substantially constant.

15. The filter bag system of claim 14 wherein said source of electrical potential varies between approximately 3,000 volts and 60,000 volts.

16. An improved filter bag system for extracting particulate matter from flowing gases, comprising: a substantially enclosed housing member having separate inlet and outlet regions; a wall member separating the inlet and outlet regions within said housing member, the wall member including a plurality of apertures therein; a plurality of first and second electrical insulator elements; a plurality of electrically conductive filter bag elements, each mounted between individual ones of said first and second insulator elements and each having an open end communicating with the associated aperture of said wall member, said filter bag elements comprising carbon cloth material having a weave which substantially restricts the passage of particulate matter therethrough; a source of controllably adjustable electrical potential; means coupled to the inlet portion of said housing member for defining therewith a settling chamber for particulate matter; means for sensing the flow rate of gases in said inlet portion; means responsive to the means for sensing for controlling said source of electrical potential; and cleaning means responsive to a predetermined electrical potential for cleaning the system.

17. The filter bag system of claim 16 wherein the cleaning means comprises an actuable mechanical actuator means mounted within the outlet portion of said housing and spaced apart from said wall member.

18. The filter bag system of claim 16 which includes an electrode centrally located within said filter bag elements and spaced apart therefrom which is maintained at electrical ground relative to the electrical potential of said filter bag elements.

19. The filter bag system of claim 16 wherein the cleaning means comprises means for reversing the gas flow within the system.